(12) United States Patent
Chen et al.

(10) Patent No.: US 11,562,376 B2
(45) Date of Patent: Jan. 24, 2023

(54) SYSTEM, METHOD, AND SMART DEVICE FOR AUTHENTICATION OF PRODUCTS AND INTERACTION WITH A VIRTUAL ENVIRONMENT

(71) Applicants: thatgamecompany, Inc., Santa Monica, CA (US); ThatMemory LLC, Bellevue, WA (US)

(72) Inventors: Jenova Xinghan Chen, Bellevue, WA (US); Amy Li Gussin, Bellevue, WA (US); Peter Lee, Fullerton, CA (US); Jeffrey Exterkate, Tarzana, CA (US); Yang Liu, Palo Alto, CA (US); Kunal Lanjewar, Lake Forest, CA (US); Botao Hu, Palo Alto, CA (US)

(73) Assignees: thatgamecompany, Inc., Santa Monica, CA (US); ThatMemory LLC, Bellevue, WA (US)

( * ) Notice: Subject to any disclaimer, the term of this patent is extended or adjusted under 35 U.S.C. 154(b) by 0 days.

(21) Appl. No.: 17/477,783

(22) Filed: Sep. 17, 2021

(65) Prior Publication Data
US 2022/0084047 A1 Mar. 17, 2022

Related U.S. Application Data

(60) Provisional application No. 63/079,622, filed on Sep. 17, 2020.

(51) Int. Cl.
*G06Q 30/00* (2012.01)
*A63F 13/65* (2014.01)
(Continued)

(52) U.S. Cl.
CPC ....... *G06Q 30/0185* (2013.01); *A63F 13/213* (2014.09); *A63F 13/65* (2014.09); *G06K 7/10297* (2013.01)

(58) Field of Classification Search
CPC ... A63F 13/95; A63F 2300/206; A63H 30/04; A63H 2200/00
See application file for complete search history.

(56) References Cited

U.S. PATENT DOCUMENTS

| | | | |
|---|---|---|---|
| 6,761,637 B2 * | 7/2004 | Weston | A63F 13/86 463/42 |
| 6,773,325 B1 * | 8/2004 | Mawle | A63F 13/02 446/175 |

(Continued)

FOREIGN PATENT DOCUMENTS

WO WO-2017116303 A1 * 7/2017

OTHER PUBLICATIONS

Andrew Manches, et al.; "Three Questions about the Internet of Things and Children"; Techtrends 59 (1); 76-83; 2015; Retrieved on Nov. 24, 2021 from <URL:https://www.pure.ed.ac.uk/ws/files/22131808/2015._Three_questions_about_the_Internet_copy.pdf>; entire document; 17 pgs.

(Continued)

*Primary Examiner* — Seng H Lim
(74) *Attorney, Agent, or Firm* — Maier & Maier, PLLC

(57) ABSTRACT

A system and method for identifying and authenticating a physical article to a virtual environment. A physical article, such as a decorative pin used in gameplay or some purchased article with anti-counterfeiting tag information, may be scanned by a mobile device and verified by a mobile device application. Such a process may uniquely identify a product as being associated with one particular customer, which may limit counterfeiting and may also allow the article to be incorporated in some form into a game or other virtual environment, such as in the form of an accessory for a game character.

15 Claims, 8 Drawing Sheets

(51) Int. Cl.
*A63F 13/213* (2014.01)
*G06K 7/10* (2006.01)

(56) References Cited

U.S. PATENT DOCUMENTS

| | | | |
|---|---|---|---|
| 2001/0002485 A1* | 5/2001 | Bisbee | H04L 9/3236 |
| | | | 705/51 |
| 2001/0034257 A1* | 10/2001 | Weston | A63F 13/235 |
| | | | 463/1 |
| 2003/0064812 A1* | 4/2003 | Rappaport | G09B 5/00 |
| | | | 463/43 |
| 2011/0216060 A1 | 9/2011 | Weising et al. | |
| 2012/0172131 A1 | 7/2012 | Boswell et al. | |
| 2012/0190452 A1* | 7/2012 | Weston | A63F 13/30 |
| | | | 463/39 |
| 2012/0276997 A1 | 11/2012 | Chowdhary et al. | |
| 2013/0196766 A1* | 8/2013 | Leyland | A63F 13/42 |
| | | | 463/36 |
| 2014/0121008 A1* | 5/2014 | Canessa | A63H 3/36 |
| | | | 463/29 |
| 2014/0252077 A1* | 9/2014 | Corby | G06Q 30/0185 |
| | | | 235/375 |
| 2014/0274313 A1* | 9/2014 | Bala | G06Q 30/06 |
| | | | 463/25 |
| 2015/0087427 A1* | 3/2015 | Wane | A63F 13/323 |
| | | | 463/43 |
| 2016/0321677 A1* | 11/2016 | Dobaj | G06Q 30/0185 |
| 2018/0047032 A1* | 2/2018 | Wu | G06Q 30/0185 |
| 2018/0108207 A1 | 4/2018 | Lyons et al. | |
| 2020/0099758 A1* | 3/2020 | Werner | G06F 16/235 |
| 2020/0222809 A1 | 7/2020 | Gadre et al. | |
| 2020/0412555 A1* | 12/2020 | Chandra | H04L 9/3278 |
| 2021/0090394 A1* | 3/2021 | Russ | G07F 17/3255 |

OTHER PUBLICATIONS

Notification of Transmittal of the International Search Report and the Written Opinion of the International Searching Authority dated Dec. 22, 2021, in connection with corresponding international Application No. PCT/US2021/050820; 12 pgs.

* cited by examiner

SYSTEM, METHOD, AND SMART DEVICE FOR AUTHENTICATION OF PRODUCTS AND INTERACTION WITH A VIRTUAL ENVIRONMENT

CROSS-REFERENCE TO RELATED APPLICATIONS

This application claims priority from U.S. Provisional Patent Application No. 63/079,622, filed on Sep. 17, 2020, entitled "SMART DEVICE," the entire contents of which are hereby incorporated by reference.

BACKGROUND

Virtual communities, including online and multiplayer gaming communities, allow users to interact in a virtual environment. Most typically, a user of one of these virtual communities may interact and experience the virtual community through an avatar, which the user may be able to customize in order to enhance their enjoyment of the virtual community and in order to enhance their identification with the character.

As noted by Turkay and Kinzer in "The Effects of Avatar-based Customization on Player Identification," player identification with an avatar or character is central to how players experience the game. According to the so-called "mirror hypothesis," viewers of any visual media, including both non-interactive media like television and movies and interactive media like video games, will tend to relate favorably to on-screen characters who are either as similar as possible to themselves (the mirror), or ones who represent someone the viewer would like to be (the magic mirror). Thus, according to this hypothesis, allowing players greater freedom to make characters like themselves or like their idealized self, through allowing full customization of aspects of a character such as character appearance, adornments, and physical properties, may thus help a player to identify with the character and get into a mindset of the character within the gaming world, increasing the likelihood of players empathizing with the characters immediately and over time, and increasing the likelihood of those players having a memorable gaming experience. (For example, a first previous study had found that users of a virtual environment who perceive a smaller psychological difference between their avatar and themselves are generally more satisfied with their avatars and spend more time online, and a second previous study had found that users interacting with a virtual avatar that they perceived as like themselves could have emotional responses similar to that demonstrated when interacting with a close other.) Turkay and Kinzer's own study noted that this effect was most pronounced when players had a greater opportunity to customize their own characters, and that players who had the opportunity to spend a significant amount of time customizing their characters to suit their own vision were much more apparently invested in the character (based on certain psychological tells like how often they mentioned the characters in the first person in follow-up interviews) than a second set of players who played with characters that had been pre-customized to look like the second set of players.

Players, in turn, may often cultivate some aspects of their external identity based on the virtual environment. Fans and users of the virtual environment often wish to purchase merchandise related to the virtual environment, such as physical collectibles or devices that are associated with the virtual environment. These fans and users of the virtual environment may then want to incorporate these purchases into the virtual environment itself. (Likewise, people who are "brand loyalists" in one area of their purchasing are often "brand loyalists" in other areas of their purchasing as well, and often perceive some aspects of their "brand loyalty" to be part of their identity. This means that "brand loyalists" for a particular virtual environment, such as intense players of a particular massively multiplayer online role-playing game (MMORPG), are also likely to be "brand loyalists" for other brands such as clothing brands and may perceive this to be an important part of their identity, and something they want their avatar to reflect if possible.) Fans and users may also wish to have physical collectibles or devices that can impact or be used in a virtual environment, in order to have their physical purchasing habits become part of their gaming experience.

It may be noted, however, that many brands which command "brand loyalty"—particularly clothing brands—may command such loyalty because of the perception that they are expensive, exclusive "luxury brands." A major reason why many people are willing to spend money on iconic fashions is because of the perceived scarcity of those fashions; those fashions are desirable specifically because they are denied to others, and thus signal the wearer's wealth and status. Authentic customers of luxury brands may perceive that their identity has been devalued if other people are able to reliably procure counterfeit versions of those luxury brands for cheap prices, and this may likewise be the case in any virtual community. As such, it may be desirable to restrict player choices in some manner within the virtual community in order to better ensure that the customization options available to a particular user better reflect the identity of the user outside of the virtual community.

There have been various attempts to make use of various smart identification technologies in order to better protect consumers against counterfeit products, and for various other related uses. Smart identification technologies employed for this purpose have included near-field communication (NFC), radio-frequency identification (RFID), quick response (QR) codes, smartcards, tamper-proof labels, and so forth. These technologies have facilitated the process of identity verification in a variety of other fields, such as in the finance sector, where proof of identity (such as proof of the identity of an individual making a transaction) is essential for viable commercial transactions. These technologies have likewise been applied to logistical supply chains in order to attempt to better address the need for identification and verification of products and goods. One exemplary case, provided in PCT Pub. No. 2017116303A1 (the details of which are hereby incorporated by reference), provides a secure dual-mode anti-counterfeit product authentication methodology and system by which a product may be associated with a manufacturer identification code provided during the manufacturing process and an NFC-enabled tag which may likewise be associated with product data, with an authentication client then being used in order to read and compare the manufacturer identification code and NFC-enabled tag in order to see if they match.

To look at NFC more specifically, NFC technology allows for contactless exchange of data between two NFC-capable devices equipped with loop antennas over short distances of several centimeters. NFC communications require an initiator and a target, whereby the initiator actively generates an RF field that can power a passive target by magnetic induction. This enables NFC targets to take very simple form factors without their own power source, including, for example, unpowered tags, stickers, key fobs, or cards. The passive data stores associated with NFC tags can be used for sharing small files such as contacts, or alternatively may provide linking information for retrieving larger media such as photos, videos, and other files from elsewhere. Active NFC devices, such as smartphones, may also be used in order to emulate passive NFC devices like smartcards, which may, for example, allow a user to provide an emulated payment card signature to a payment card reader using their smartphone.

While NFC is most commonly used in dedicated identification structures such as tags and smart cards, the consumer goods field of smart product identification has, somewhat more recently, also made use of NFC tags directly embedded within the products themselves. One example application of this is the "toys-to-life" concept, a video game feature that makes use of physical figurines, like Nintendo's "AMIIBO" figurines, in order to allow players to interact with video games in a different manner. Recent Nintendo consoles, starting with the WII U, have included an active NFC reader, which may be paired with a passive NFC receiver in the AMIIBO figurine. Figures may be scanned into a game, which may allow characters on the figures to be used within the game, or may provide other beneficial effects. It has likewise been contemplated to embed similar smart product identification structures into trading cards, such as Nintendo's AMIIBO cards, which may include an electronic component for contactless communication, as explained in U.S. Pat. No. 10,279,273 (also published as US Pub. No. 20180078864A1), the details of which are incorporated herein by reference.

Existing attempts to use this technology for anti-counterfeiting purposes, however, have all had certain flaws. For example, if a product—like the AMIIBO—encodes product-specific information within the product and uses digital signatures encoded within the product for verification of authenticity, bypassing the need for online verification, the authentication information can simply be cloned from one single authentic product, meaning that each of a million counterfeit articles may all report that they are the authentic version of that cloned authentic product.

If certification is instead done by having the user contact an online server, however, different problems may arise from this. For example, if the product includes a scannable barcode or RFID tag that the user can scan to take them to an online page that shows that the product is authentic, or the product otherwise contains the linking information for an online verification page, the product could easily contain a link to a fraudulent online page that reports that the product is authentic. Such authentication also requires that verification rely on a centralized certificate authority and a centralized database, which carries with it the normal problems associated with centralization. A centralized authentication service inherently relies on a single point of failure—the authentication server operated by the manufacturing company—and if this fails in any way then authentication cannot be performed in any manner. If the authentication server is attacked via cyberattack, records of legitimate products may be lost or fraudulent products may be added; the latter may be performed through insider fraud as well. If authentication via the server includes significant user data being passed to the server, this creates a much higher lower bound on the server resources required to perform verification, and may make many people uncomfortable that the company has that data in the first place. Finally, many luxury goods such as watches or film cameras (or other expensive durable goods such as tools, or products with a collector value such as baseball cards or limited-run toys) may simply outlive the company, or may outlive the company's interest in manufacturing the product. (For example, Minolta or Topcon cameras, Kenner collectible action figures, and Sennheiser consumer audio products are still used and traded at relatively high prices despite the companies exiting that market or going defunct.) Such issues may need to be addressed with product verification systems generally, as well as for product verification systems that may be particularized to the process of verifying consumer products for use in or with a virtual environment.

SUMMARY

A system, method, and smart device may be provided, which may allow a user to interact with physical objects equipped with smart identification technologies such as NFC and may permit the user to impact a virtual environment by such interaction. Exemplary embodiments of a smart device such as is provided herein may be configured to communicate with a reader device capable of communication with a game server. In one such exemplary embodiment, the user may scan an object, such as a consumer product, that is equipped with smart identification technology, may verify the authenticity of the consumer product by their scan, and may then integrate the consumer product in some form into a gaming experience of the user or otherwise integrate the consumer product into the virtual environment.

In an exemplary method by which a user may verify the authenticity of a product by the use of smart identification technology employed to confirm authenticity, it may be contemplated for a product to contain an integrated NFC tag. A user may scan the integrated NFC tag via a mobile device operating an integrated software application, or with another device such as a smart device used as a peripheral of the mobile device, which may then interact with an online service in order to determine the authenticity of the associated product. Beneficially, this process may offer added security against counterfeit goods that may also include counterfeit smart identification technologies.

According to an exemplary embodiment, a system and method may particularly be provided that may operate on at least one physical tag having a scannable component, the scannable component having an antenna communicatively coupled to a non-volatile memory and configured to transmit data stored on the non-volatile memory from the antenna upon scanning of the antenna and energization of the antenna; and a mobile device configured to interface with the scannable component, having a mobile device antenna configured to energize the antenna, the mobile device further having a game program configured to provide a game and associated with a game user account.

The mobile device may, in this case, be operable to perform steps of: receiving, on the mobile device, an instruction to perform an authenticity verification of the scannable component; determining that the mobile device is within range of the scannable component, energizing the scannable component, and retrieving information from the scannable component, said information including identification information for a user uniquely associated with the scannable component; based on the identification information, activating a feature within the game, wherein activating the feature within the game comprises an interaction with game information of the user uniquely associated with the scannable component; and updating stored game data of the game based on the activation of the feature.

It may be contemplated for the physical tag to be a decorative pin or badge having the scannable component embedded therein. Such a pin may have a flat front side and a rear side having a coupling configured to attach to clothing of a wearer, the scannable component having a near-field communication (NFC) component.

A user associated with the scannable component may be another user, associated with a second game account, and activating a feature within the game may comprise initiating an interaction between the game user account and the second game user account, such as moving one character to a position of the other. Alternatively, the user may be the same user that is performing the scanning, with this user then being able to scan things other than a game account badge such as articles of clothing for incorporation within the game or other game effects.

In an exemplary embodiment, the system may be combined with, or may incorporate, an anti-counterfeiting procedure, whereby a user may provide, with the mobile device, to an online service comprising a server, identity authentication information; send, with the mobile device, a verification request to the online service; and receive, on the mobile device, a verification response from the online service. Based on a result, the article may be bound to the user, or the user may be informed that it is bound to someone else. Some component of the article may also be activated upon scanning, if desired; for example, it may be contemplated to energize an LED as well as a NFC component while performing a scan, so that it can be determined that a scan is in progress.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
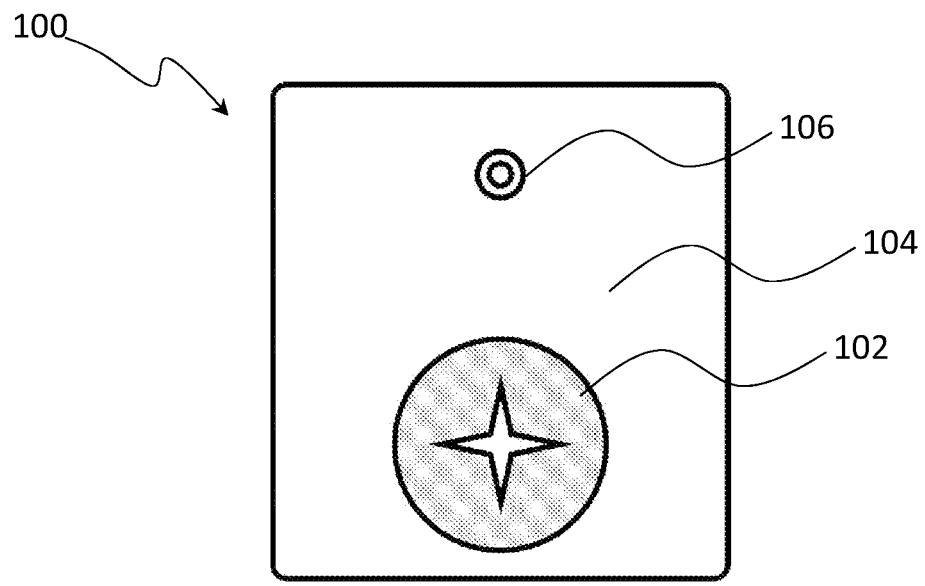
FIG. 1 shows an exemplary embodiment of a smart device which may be scanned via a reader device, shown from a rear side.
Figure 2:
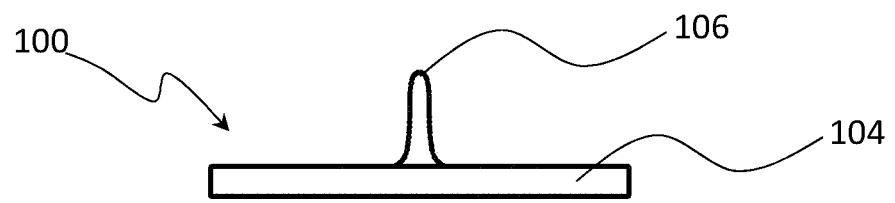
FIG. 2 shows an exemplary embodiment of a smart device, shown from a top side.
Figure 3:
FIG. 3 shows an exemplary embodiment of a smart device, shown from a right side.
Figure 4:
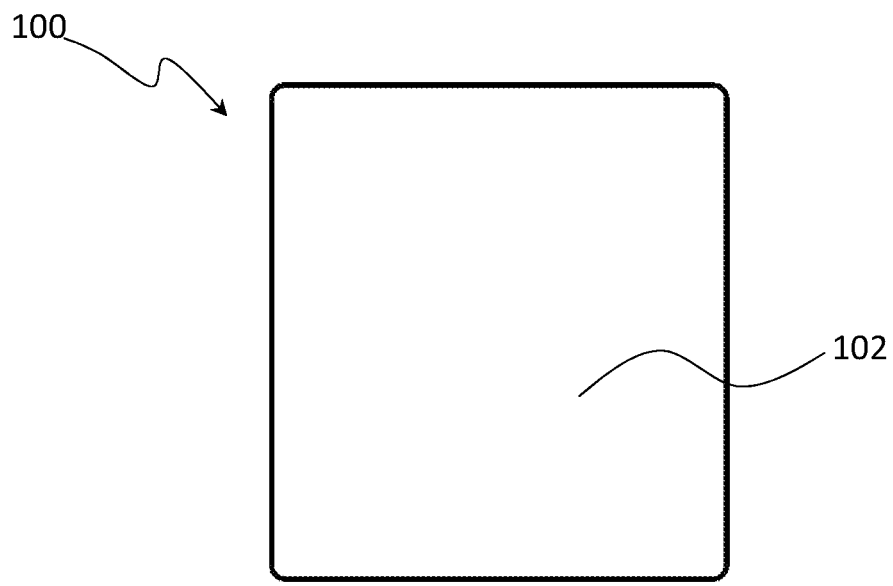
FIG. 4 shows an exemplary embodiment of a smart device, shown from a front side.

Looking first at FIGS. 1-4, it may be contemplated to provide a smart device having certain functionality and which may be scannable by a reader system. In an exemplary embodiment, a smart device may be, or may be incorporated into, a physical device for use with a virtual environment. Various exemplary embodiments of a smart device may be or may be embodied in a collectible, a piece of memorabilia, a toy piece, jewelry, a clothing item, or any other item as would be understood by a person having ordinary skill in the art. Each of FIGS. 1-4 may show a view of this exemplary smart device from a different side, with FIG. 1 showing the device from the rear, FIG. 2 showing the device from the top, FIG. 3 showing the device from one side, and FIG. 4 showing the device from the front. Variations on this design may of course be contemplated; for example, it may be contemplated to provide additional graphics or guide elements on a front of the smart device, such as a logo of a game or other virtual community to which the smart device relates.

For example, according to one exemplary embodiment, a smart device may be, or may be incorporated into, a decorative pin 100 to be worn by a person. It may be contemplated for the decorative pin 100 to have a scannable component 102, such as a near-field communication (NFC) component, embedded within a body 104 of the decorative pin 100 or affixed to the body 104 of the decorative pin 100, as well as a clasp 106 (such as a pin, clip, or magnetic element) which may operate to secure the decorative pin 100 to the person's clothing. In another exemplary embodiment, scannable component 102 may be provided on a surface of the body 104 of the decorative pin 100, and may be or may include a visible element; in certain exemplary embodiments, this may be an optically scannable element intended to provide digital data, such as a QR code, and in other exemplary embodiments, a visible element may facilitate alignment of a scanning system with an embedded scannable component 102. In further exemplary embodiments, it may be contemplated for a scannable component 102 of the decorative pin 100 to incorporate multiple methods of validation, such as a NFC component embedded within the decorative pin 100 paired with a QR component provided on the decorative pin 100; in certain exemplary embodiments, it may be contemplated to provide a pairing of the methods of validation such that each scanned element incorporates the same data and may each be scanned in the alternative, such that each scanned element incorporates a portion of overall data and must each be scanned in order to retrieve all necessary data to complete a scan, or as desired.

The scannable element 102 may store data which may be accessed and retrieved by a scanning device, either directly or indirectly; for example, it may be contemplated for data to be embedded in the scannable element itself in some exemplary embodiments, and may be contemplated for other data to be accessible remotely by a link provided in the scannable element in other exemplary embodiments, or for the two to be used in combination as desired. For example, in an exemplary embodiment whereby the scannable element 102 is a NFC component, the scannable element 102 may incorporate a non-volatile memory which may store a limited amount of data (generally an amount under 10 kilobytes), which may be accessed by an NFC reader device and powered by the act of scanning the scannable element. While in some exemplary embodiments it may be contemplated to use a passive NFC component that is purely powered by the NFC reader device, it may also be contemplated to provide some level of active NFC communication from the smart component 102; for example, it may be contemplated for the scannable element 102 to be coupled to one or more power sources that may enable it to communicate via a NFC peer-to-peer operation. (In one exemplary embodiment, the decorative pin 100 may be provided as a stand-alone device without further connection ports or peripherals, and as such it may be contemplated to recharge the device via NFC beam; in another exemplary embodiment, the decorative pin 100 may carry other functionality and may be charged in another fashion.)

According to some exemplary embodiments, the scannable element 102 may be associated with a particular user. For example, in an exemplary embodiment, the scannable element 102 may include data stored in the component that specifically associates the scannable element 102 with the user, such as identity information of a user or a link to a profile of the user within the game. In an exemplary embodiment, it may be contemplated to have the scannable element 102 have a unique identifier that is provided at the time of purchase, which the user may then associated with a character in the virtual community by entering the unique identifier; in another exemplary embodiment, it may be contemplated to have the scannable element 102 store one or more data values associated with the user, such as a name or username of the user, upon the user executing one or more registration actions (such as may be performed upon purchasing or taking possession of the device).

In an exemplary embodiment, it may be contemplated that a smart device may be capable of impacting a virtual environment by communicating with a reader device that is in turn capable of communication with a game server. The data may be utilized by a software application, mobile game, or online platform, which may be used to access a virtual environment, such as a game. For example, once the reader executes a scan of a smart device such as by scanning the scannable element 102 of a decorative pin 100, the reader may, in turn, convey information associated with the scan to the software application, for example by conveying this information to a game server in order to change a state of the game or of another such virtual community.

For example, in one exemplary embodiment of a system where the virtual community is a game, it may be contemplated to have the scanning action trigger a friend request within the game, provided from a character associated with the user of the reader to a character associated with a wearer of the decorative pin 100, or it may be contemplated to have other functionality trigger within the game which may be intended to require that each party meet up in an out-of-game environment in order to trigger. For example, one embodiment of a game may contemplate that abuse of other players in the in-game chat is less likely to take place if the players know each other in real life, and so may restrict use of the in-game chat unless one of the players has scanned a smart device associated with another. Another embodiment of a game may allow players to pair as a party or a raid group, either generally or for certain in-game events, only when one has been able to scan a smart device of the other.

A decorative pin 100 or other smart device, and a scannable component 102, may be used to provide authenticity verification of a user or the device. The data stored on the scannable component 102 may be used to verify the authenticity of the user or device upon scan; for example, it may be contemplated to have a player with a decorative pin 100 send some sort of request within the game first to a receiving player, with the receiving player then needing to scan the player's decorative pin 100 in order to confirm the request. In the event that the receiving player has received a request that does not agree with the authentication information contained within the decorative pin 100, the request may be rejected, while if the request does agree with the authentication information, it may be automatically confirmed, such as may be desired.

Furthermore, the decorative pin 100 or other smart device may embody or incorporate a physical identifier, which may indicate the presence of the scannable component 102 and its association with a particular virtual environment. As noted, this may be directly functional (such as a QR code), but may also be an indication of something that the scanning player may be able to identify within the game. For example, a logo or design, such as a star, may be provided over a scannable component 102, and may have some sort of in-game significance; for example, this may indicate a team or faction within a virtual community, a character class, or any other such information. (It may, for example, be contemplated for a scanning player to have to identify this information within the game, with the scanner, prior to scanning the scannable component; for example, when the physical identifier is an in-game character, an option to scan the scannable component that is presented via a game interface to the scanning user may request that the user select the character to be added prior to scanning, and provide a set of selectable character options on the interface.) In this manner, smart devices such as decorative pin 100 may promote having a user form real-life connections and experiences inside and outside of the virtual environment.

It may be contemplated to have each scannable component 102 of each smart device be provided with unique feature based on the device, which may allow a user to scan it with a computer, game system, controller, or mobile device capable of reading the scannable component 102 while playing a game or accessing the virtual environment. In an exemplary embodiment, reading the scannable component 102 may activate features in the game. Features may optionally include actions, spells, apparel, objects, or other items as would be understood by a person having ordinary skill in the art. These may be provided as actions to be stored and, later, executed by a character of a scanning player, or may be actions applied immediately; for example, a player might be able to use scans of other characters to help in a boss battle, with each scan of some other player depleting the boss's hit points (which may be visualized as the scanned player's character making an attack against the boss based on a strength of the scanned player's character when scanned), or a player might heal their own character immediately upon making a scan of a valid scannable component 102. In other embodiments, this may create some in-game relationship of special significance; for example, in a stronghold building game, a scan action may create a "trade route" that gives each player resources over time.

In an exemplary embodiment, a game account or virtual environment account may be associated with a particular scannable component 102 of a smart device by scanning the scannable component 102 to a reader device such as a smartphone. For example, a user may be provided with the option to pair a given scannable component 102 to an existing character in order to enable additional functionality, and may, for example, have multiple such pairings. In another embodiment, a smart device product with a scannable component 102 may facilitate or enable joining an in-game community; the user may be able to create an account after having purchased a decorative pin 100 or other such smart device.

A given smart device may also be used for game invitations, where a user may create an in-game invitation for others who scan the scannable component 102. This may, for example, facilitate welcoming new characters into the virtual community; in an exemplary embodiment, a user that is not involved in the virtual community who scans a scannable component 102 worn by another player may be provided with invitation information that allows them to join the virtual community with some pre-existing relationship with that other player being applied. For example, in a circumstance where a player scans a scannable component 102 of another player in order to receive an invitation to play a game, the first player may be considered to have been referred by the second player, and this status may be applied to an account of each player, enabling additional functionality. (For example, the old player may share experience points with the new player until the new player is at a certain stage of advancement, helping the new player to advance to a similar level as the player he knows out of game more quickly, or the old player may unlock rewards when the new player completes certain milestones within the game, incentivizing an old player that knows a new player to motivate the new player to play the game at the initial stages.)

It may also be contemplated for a scannable component 102 to activate temporary in-game actions executed by each player, such as social spells, when scanned during gameplay. In one exemplary embodiment, a "social spell" may be triggered when a player scans a friend's scannable component 102, and may cause the player to automatically join the friend wherever the friend is in the virtual environment at that time. Social spell examples may also optionally include the ability to piggyback to a friend or warp to favorite friends, or perform other types of actions; for example, players might be able to perform a "magic ritual" within the game when each player has been verified as being at a certain physical location via a device GPS and has scanned each other player to verify that the other players are also present, which might enable or facilitate certain functionality such as claiming an area for a given faction or allowing a character to adopt a new character class.

In certain exemplary embodiments, smart devices such as decorative pins 100 may inherently contain pairing or linking information—for example, being initially provided in packs of two with a permanent link between the two devices—to facilitate linking of friends in a physical and virtual environment. In some exemplary embodiments, such features may be accessed when a particular scannable component 102 is scanned (either permanently or for a limited time thereafter), even when certain in-game status has not yet been unlocked or achieved, such as a friendship level, that would otherwise enable these features within the game. However, in some embodiments, in-game status and/or levels may be required to access some or all of the functionality of a particular scannable component 102; for example, a player may be able to teleport to the location of some permanently-paired other player only upon completion of a tutorial mission.

According to still further exemplary embodiments, a teleport function may be accessed through a scannable component 102. For example, a user may teleport to a particular location in a virtual or game environment when the scannable component 102 is scanned, which may in some exemplary embodiments be particularly associated with a character of the scanned player; for example, in one exemplary embodiment, a player belonging to a "knightly order" game faction that is allied with a "wizard" faction may scan a scannable component 102 of a "wizard" player to teleport to a "wizard's tower" area that is particularly associated with that faction. According to some embodiments, this ability may be transferred to additional users in the virtual environment. For example, players in the virtual environment may be arranged in a particular group (such as a party) or may be physically arranged in a certain manner (such as arranging themselves around the character of the player scanning the scannable component, or linking hands with said character), and may also be teleported upon activation of this functionality by the scanning player.

Still further, it may be contemplated for some embodiments of a scannable component 102 to be used to provide increased or new action functionality. According to such functionality, scanning a scannable component 102 may provide increased power for a user action or a different type of user action, such as creating a shockwave in a virtual environment with a stronger power than the user is typically capable of creating (for example, based on a combined power statistic of the user's character and a character associated with the scanned player). Similarly, new or special actions, such as fighting moves or techniques not otherwise available to a scanning user, spells requiring multiple participants, summoning of other characters or creatures, or increases to character attributes, may be provided; or alternatively a cost of performing these actions may be adjusted (for example, it might be more efficient to execute a spell with a larger number of people). According to an exemplary embodiment, scanning a scannable component 102 may provide the scanning user with a special summoning technique to summon other beings, users, characters or creatures in a game environment.

In addition to the above, it may be contemplated to use a scannable component 102 to trigger display of a help or reference character or feature. For example, when a scannable component 102 is scanned during gameplay, this may send a request for help to an associated character, or may trigger an in-game helper character to appear; this may, for example, be triggered if a user scans a scannable component 102 that is associated with their own character or which is worn on their own decorative pin 100.

According to a further exemplary embodiment, it may be contemplated to integrate scannable components 102 into other types of smart devices, or smart devices having apparel functionality. Scanning a scannable component 102 with apparel functionality may unlock certain apparel for a user's character, or cause the user's character to wear it; this may, for example, be contemplated to provide the user's character with an option to wear an apparel item such as a cape, mask, or scarf in the virtual environment. The apparel may be permanently accessible for the user or may be accessible for a limited duration. In some exemplary embodiments, this may be integrated into a decorative pin 100, which may provide some level of apparel functionality; for example, by scanning a decorative pin of a player from a different region, a player may unlock an article of clothing within the game that is distinct to that region. While the term "apparel" is used here, unlockable items may not be limited thereto; for example, in some other exemplary embodiments, cosmetics other than apparel may be unlocked in a similar manner, as may articles with a non-cosmetic use, which may be provided in addition to or instead of the apparel. It may likewise be contemplated for apparel to have non-cosmetic uses, even in embodiments where the in-game apparel reflects out-of-game apparel; for example, a user that scans their new winter coat may be able to equip something similar on their character, giving their character better resistance against frost-elemental damage. Likewise, it may be possible for the unlockable items, such as apparel or other items, to be applied to a user's game other than by having these components be directly worn or made wearable by the user; for example, in some exemplary embodiments, it may be possible to have one or more enemy characters, or one or more other characters that the user can interact with, wear an article of apparel instead. (For example, in one exemplary embodiment, an enemy boss character may be given a particular funny hat to wear.)

Scannable components 102, such as NFC components, may be implemented in a number of items or smart devices, such as umbrellas, pins, necklaces, bracelets, stickers, scarves, blankets, keychains, and product packaging. Scannable components 102 may initiate changes in a virtual environment upon scanning, which may in some exemplary embodiments be in some way associated with the article in which the scannable component 102 is embodied and in some exemplary embodiments may not be directly associated with said article. For example, in a first exemplary embodiment, a user that purchases a certain article may be able to scan said article and add it to an in-game character, while in another exemplary embodiment a user that purchases a certain article may receive an in-game reward sponsored by the merchant that is not the same as the article they purchased, and may for example receive in-game currency upon scanning an NFC component in an article of clothing or may receive in-game apparel upon scanning a NFC-equipped vibrating pager device at a restaurant.

In certain exemplary embodiments, it may be contemplated for in-game actions to control a smart device, such as a decorative pin 100 with some kind of output functionality like LED lights or some other kind of smart device. In an exemplary embodiment, a given smart device may be paired with another device that is capable of reading a scannable component 102 within the device. For example, in an exemplary embodiment, a user may have an umbrella operable as a smart device, which is provided with a scannable component 102, and which may have an output device such as a LED light. When a device capable of interacting with the umbrella is brought within range of the umbrella—for example, when a device capable of interacting with an NFC component of the umbrella is brought to within a few centimeters of the umbrella—the NFC circuit of the umbrella may be activated, and the umbrella may light up, indicating that the device is properly positioned. It may likewise be contemplated for a longer-range smart device to serve as an indicator of when there are fellow users of the virtual environment in close proximity, or certain users such as friends or faction members within the game. (For example, it may be contemplated for a given smart device to include a Bluetooth antenna and to light up a first LED when a device is detected within Bluetooth range; other personal area network (PAN) standards, near-me area network (NAN) standards, and local area network (LAN) standards may also be appropriate for this, as desired.) It may also be contemplated for a smart device to function as an identifier for any offline events or exhibitions associated with the game or virtual environment. Users may optionally only use their game or virtual environment identification details in such instances.

Other personalization functionality of a smart device may also be contemplated. For example, in an exemplary embodiment (such as in an exemplary embodiment where a size of a non-volatile memory linked to a smart device is relatively large, or an embodiment in which the scannable component 102 provides a link to some other data repository) it may be contemplated for a user to provide user-specified custom content associated with the game in association with the scannable component 102. For example, it may be contemplated to store, in the memory of the scannable component 102 or in a remote location, a saved copy of a player's favorite memory in a game; for example, a scanning player may be provided with a link to a picture or video clip showing a player's greatest accomplishment within the game.

Likewise, it may be contemplated for embodiments of the smart device, such as a decorative pin 100, to duplicate other functionality not directly associated with the game. For example, it may be contemplated for the smart device to duplicate a payment card of the user or a rewards card of the user, such as a rewards card associated with a sponsor of the game. In an exemplary embodiment, a user may be able to retain payment information in the smart device and complete a payment with the smart device, or may be able to earn a reward by scanning the smart device at a payment system instead. Rewards may include, for example, rewards provided from a sponsor (such as access to coupons or other customer rewards information), rewards provided within the game (such as virtual currency or items for using the sponsor), or charitable donations made in the name of the player or other such rewards associated with a third party (for example, there may be an arrangement for a sponsor to plant one tree every time the smart device is used as a payment device in the retail store of the sponsor).

In an exemplary embodiment, other scannable component functionality may be provided from scannable components 102 in addition to the ones previously listed, such as generic scannable components 102 not associated with a smart device, which may be intended to convey other information. For example, it may be contemplated that, in an exemplary embodiment of a game where the player can interact with the character of another player upon scanning a smart device associated with another player, a player may also be able to scan other smart devices not associated with any other player, which may in this case trigger an interaction with a non-player character. For example, if a player scans a smart device that is not recognized as connected to any other player, it may be contemplated for the game to switch a player's point of view to a non-player character's point of view, such as a point of view of some existing non-player character within the game or a point of view of some non-player character that is created or summoned based on the scan (such as a helper character).

As noted previously, in addition to apparel, it may be contemplated to integrate other articles or other objects into the game, based on scanning of a scannable component 102 associated with those articles. Likewise, it may be contemplated to integrate scannable subject matter that is not defined as an object within the game. For example, in one exemplary embodiment, it may be contemplated that a NFC component or other scannable component 102 may be scanned in order to change ambient features within a game, such as the music playing in a particular game environment like a player's stronghold, or the weather in a player-controlled area of the game. In other exemplary embodiments, other attributes associated with a player-controlled area of the game or in a personal player instance or session of the game may be changed; for example, it may be contemplated to change a time of day of a player-controlled area, or the time of day in a player-controlled session, to another time of day. For example, if the user scans a scannable component 102 in an object associated with a different time zone, such as a scannable component 102 of another player who lives in that time zone or a scannable component 102 in an article of apparel from a famous brand associated with a particular foreign country, a local time in a player session may be updated to match the time zone associated with the scannable component 102. (It may, for example, then be contemplated to have certain game activity be possible only at certain kinds of day—for example, it might only be possible to fight a vampire boss at night—which may then be facilitated by use of the scannable component 102.) Any combinations of such activity may also be contemplated; for example, in an exemplary embodiment, a scannable component 102 may be associated with a given location, and a scan of the scannable component 102 may retrieve both the current time and the current weather associated with that location, as retrieved from an online weather service. A player's controlled area may then be updated based on both the current time of day and the current weather in that area, allowing, for example, a user in a location where it is currently noon and sunny outside to access content accessible at midnight or in stormy weather.

It may be contemplated that any functionality provided via the scannable component 102 may have temporary effects or permanent effects within the game. For example, according to several exemplary embodiments, it may be contemplated that scanning a scannable component 102 may facilitate actions and features in the virtual environment for one-time use, permanent use, limited duration use, repeated use, and/or repeated use with periods of down-time between uses, as would be understood by a person having ordinary skill in the art.

Figure 5:
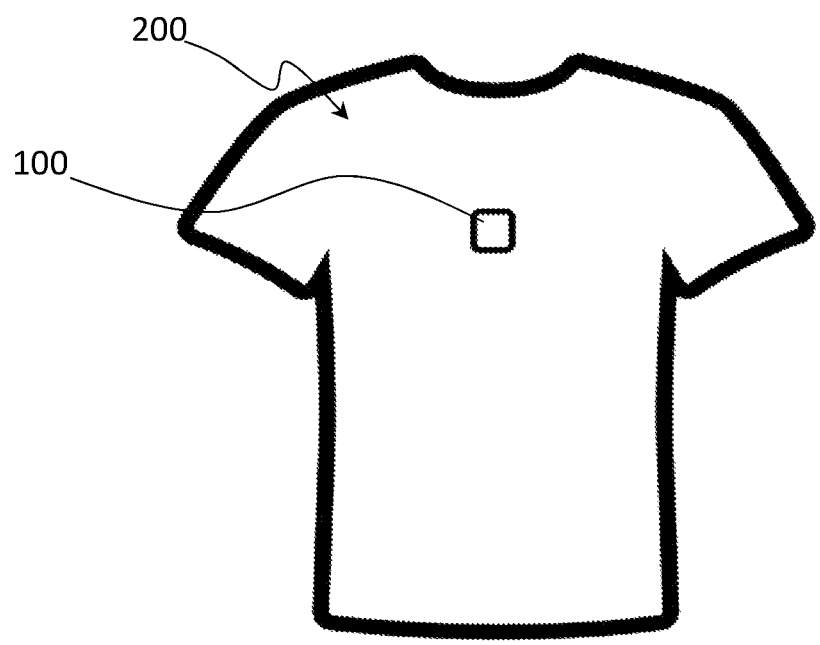
FIG. 5 shows an exemplary embodiment of a placement of a smart device on a garment.

Looking now at FIG. 5, FIG. 5 shows an exemplary embodiment of a placement of a smart device on a garment 200. In an exemplary embodiment, this smart device may be a decorative pin 100 that is worn on a garment 200, and may for example be worn in a visible area such that another person, such as another party that is playing the game or participating in the virtual community, can readily recognize and scan the decorative pin 100. It may be contemplated, for example, for a front of the decorative pin 100 to display one or more graphics relating to the game or virtual community, such as an image of a character from the game or a symbol of a faction from the game. In various exemplary embodiments, a decorative pin 100 or other such smart device may be of various sizes. For example, in some exemplary embodiments, a decorative pin 100 may be provided as a lapel pin (which may, for example, incorporate a small 5 mm NFC tag as a scannable component 102), or may be provided as an event namebadge or other larger pin.

It may likewise be contemplated for a smart device to be permanently integrated into the garment 200; for example, it may be contemplated to provide a scannable component 102 within a fabric layer or pocket of the garment 200. Various placements of a scannable component 102 on the garment 200 may be contemplated. For example, it may be contemplated to provide a scannable component 102 on a chest area of the garment 200, in a similar position to where a decorative pin 100 might be worn; in various exemplary embodiments, the garment 200 may also incorporate other features that might be provided on the decorative pin 100, such as a logo displayed over a position of the scannable component 102, a faction badge on a pocket of the garment 200, and so forth. In such an exemplary embodiment, it may be contemplated to have the smart device in the garment 200 replace the decorative pin. In other exemplary embodiments, a scannable component 102 may be incorporated into the garment 200 in a different location, optionally a location less directly accessible to scanning by other players such as on an internal clothing tag of the garment 200; in one such embodiment, it may be contemplated for the scannable component 102 to incorporate a garment 200 into a game or other virtual environment via scanning by a player, with a decorative pin 100 then being separately worn to facilitate gameplay. In one such exemplary embodiment, it may be contemplated for a scannable component 102 to be incorporated into an anti-counterfeiting or validation process for the garment 200, such as a validation process for ensuring that a garment 200 is specifically and uniquely identified with a particular user.

Looking now at FIGS. 6-10, various stages of an exemplary process for verifying the authenticity of products, such as apparel, may be contemplated. According to an exemplary embodiment, an overall process may include several stages, including a product registration process, an initial validation process, and a consumer verification process, which may itself be split into multiple stages.

Figure 6:
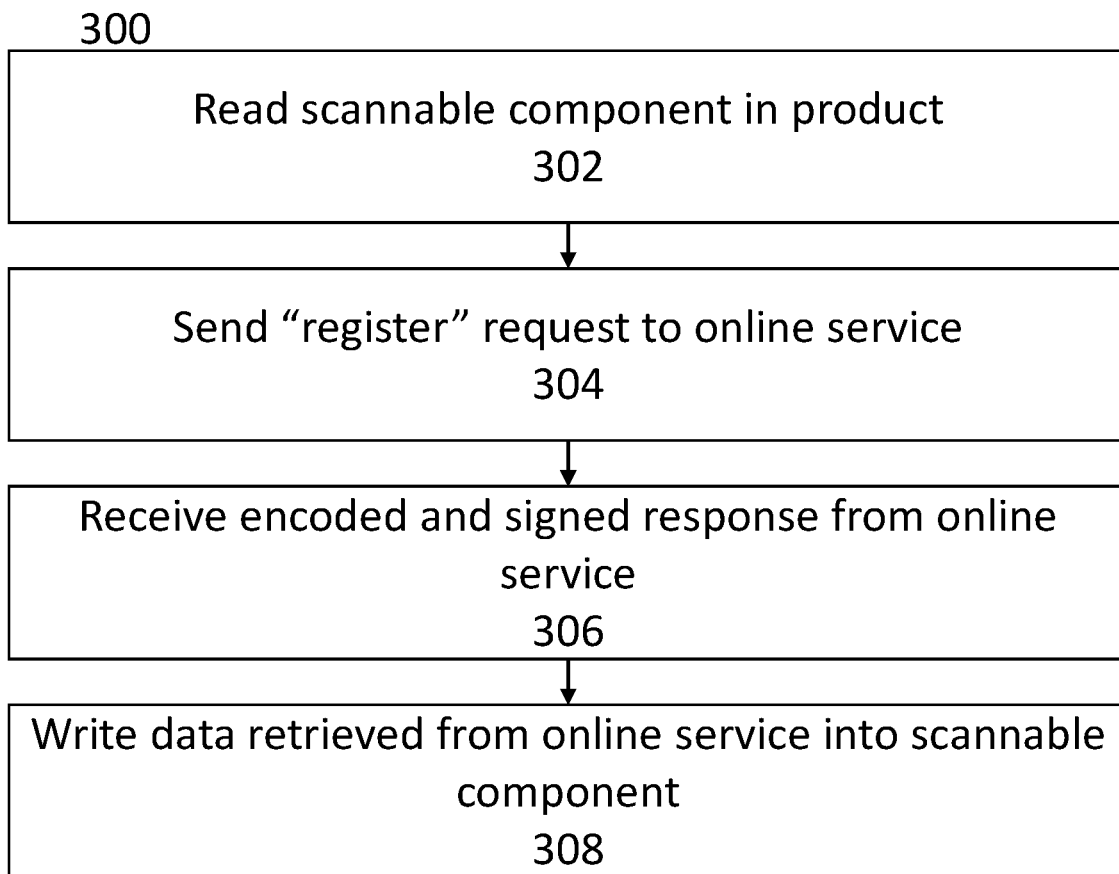
FIG. 6 shows an exemplary embodiment of a product registration process.

Looking first at FIG. 6, FIG. 6 depicts an exemplary embodiment of a product registration process 300. According to an exemplary embodiment, a manufacturer, or alternatively a distributor, a vendor, or another party in the supply chain of a product, may register a product after manufacturing it or after receiving it, which may enter information associated with a scannable component 102 of the product into the system. In a first step 302, a manufacturer may read scannable component 102 information, such as information stored on a NFC tag that had been associated with the product, with a component reader such as an NFC reader. In some exemplary embodiments, a reader may be, for example, a mobile device with an integrated NFC reader operating a product registration application configured to communicate with a server, though any other readers may for example be contemplated; for example, it may be contemplated to have a reader provided in a fixed position on an assembly line that may read NFC tag information after it is applied to a given product and subsequently communicate with a server provided by the manufacturer.

In a second step 304, a reader of the manufacturer or other party may send a "register" request to an online service. Once this has been received by the online service, the online service may send an encoded and signed response back to the reader, which may be received in a third step 306. The reader, communicating with the scannable component 102, may then write the response information from the online service to the scannable component 102, for example by writing the information to the non-volatile memory of an NFC tag, in a fourth step 308.

Figure 7:
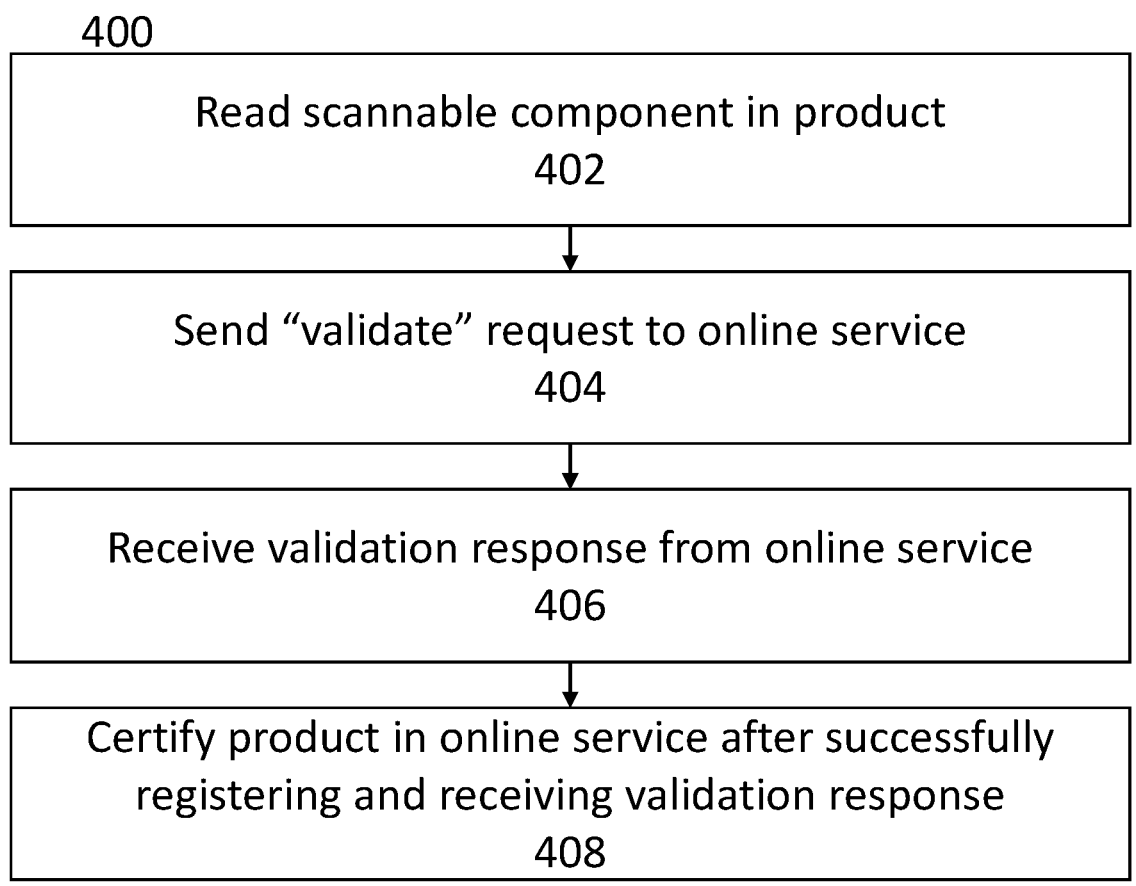
FIG. 7 shows an exemplary embodiment of a product validation process.

Looking next at FIG. 7, FIG. 7 depicts an exemplary embodiment of a product validation process 400. According to an exemplary embodiment, a party in the supply chain of a product, such as a manufacturer, distributor, vendor, and so forth, may validate a product after a registration stage; for example, it may be contemplated to have a manufacturer apply a NFC tag or other scannable component 102 and perform a product registration process 300, and it may be contemplated to have a distributor of the product validate the product upon receipt of the product from the manufacturer. Other configurations may likewise be contemplated; for example, it may be contemplated to have a retailer perform validation of the product upon receipt and inspection of the product, just prior to sale.

In an exemplary embodiment of a product validation process, it may be contemplated for the validating party to read the scannable component 102 in the product in a first step 402; this may be, for example, an NFC tag embedded within the product during manufacturing. In a second step 404, a reader of the scanning party, which may be a smartphone or other such device, may send a "validate" request to an online service. The online service may provide a validation response, which may be provided to the reader of the scanning party in a third step 406. This may likewise update the online service, as provided in a fourth step 408; a given product may be certified in the online service only upon successful receipt of a register request in a product registration process and successful validation of the product by an intended destination party. These transactions may be logged in the online service.

Figure 8:
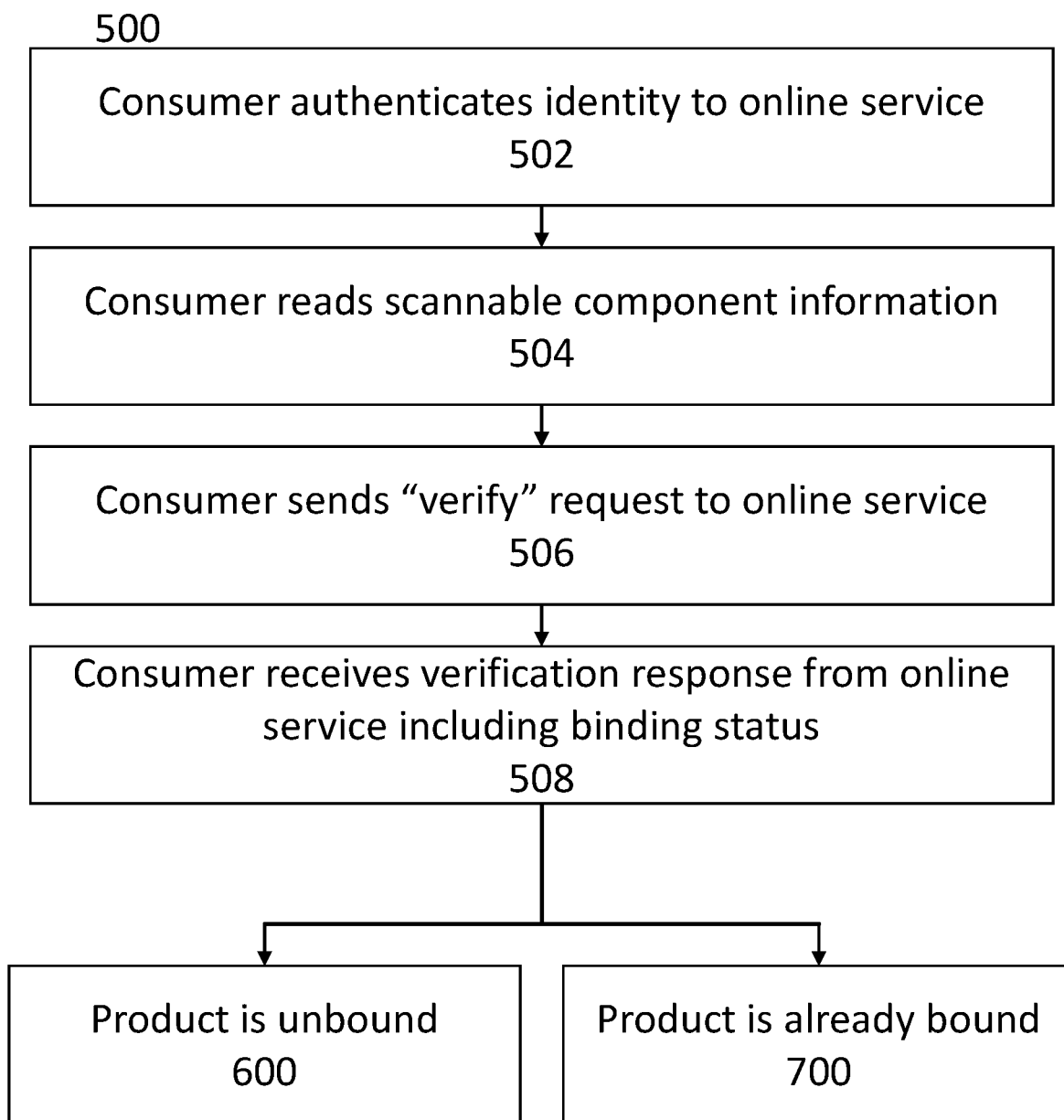
FIG. 8 shows an exemplary embodiment of a consumer verification process.

Looking next at FIG. 8, FIG. 8 depicts an exemplary embodiment of a consumer verification process 500, which may be performed by a consumer once they have purchased the product or in order to verify the product prior to purchasing. In a first step 502, a consumer may authenticate their identity to the online service, such as by a credential of the consumer linked to a consumer online account. In a second step 504, the consumer may use a scanner device, such as a mobile device equipped to scan NFC tag information, in order to read information encoded in a scannable component 102 of a product; it also may be contemplated for a consumer to use a scanner operated by another party, such as a fixed-position scanner provided at a scanning kiosk by a retailer, if desired. In a third step 506, the consumer may send, with their scanner device, a verification request to an online service; based on the scanned information from the scannable component 102. The consumer may then receive a verification response from the online service in a fourth step 508, which may indicate whether the product has been bound to a specific party (for example, whether it has been associated with the name or other information of the particular consumer) or whether it is unbound.

Figure 9:
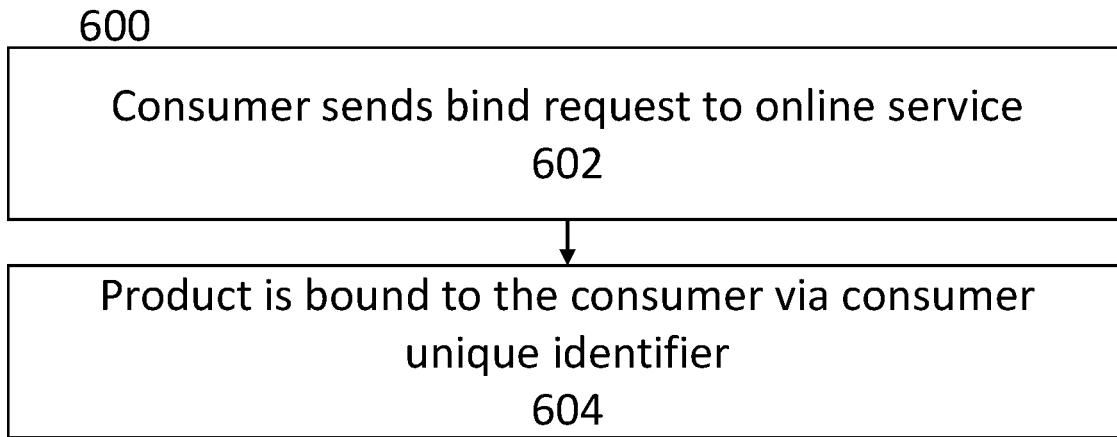
FIG. 9 shows an exemplary embodiment of further steps of a consumer verification process.

In the event that the product is not currently bound to any party or any identifying information, as provided in FIG. 9, a scanning device of a consumer may then perform a binding process 600, if desired. (It may also be contemplated to have the scanning device merely check to see if the product is actually unbound, for example if the customer wishes to check whether the retailer is actually an authorized retailer and the product has not yet been sold.) In a binding process 600, a scanner of the consumer may send a bind request to an online service 602, which may associate the product, in the online service, with a consumer unique identifier provided by the consumer or provided by the online service 604. In an exemplary embodiment, a given product may then be fixedly associated with the consumer based on the binding step, in a manner that prevents a further consumer from binding the product to themselves in the online service instead unless explicitly unbound by the owning customer; for example, it may be contemplated to have the online service refuse further bind requests until the online service has received a request to unbind the product from a scanner application of the consumer.

In an alternative embodiment, it may be possible to have the product unbound by another party under come limited set of circumstances, with the record of the third-party unbinding being provided as a permanent record associated with the product; for example, if the original owner donates the product to a thrift store, a record showing the binding by some original owner and the unbinding by the thrift store may be provided to any subsequent consumers of the product. This means that some corrective measure could be applied in the event that the original owner neglects to unbind the product, while still maintaining a record of there being one authentic product and its last known possessor. This may also allow the original owner to transfer or resell a product in the event that they do not have access to their scanner device, for example if the user's mobile phone is lost, stolen, or damaged, or if the user is themselves inaccessible. (For example, if the user dies and the user's possessions pass to their estate, it may not be possible for the user to complete the unbinding step.)

Figure 10:
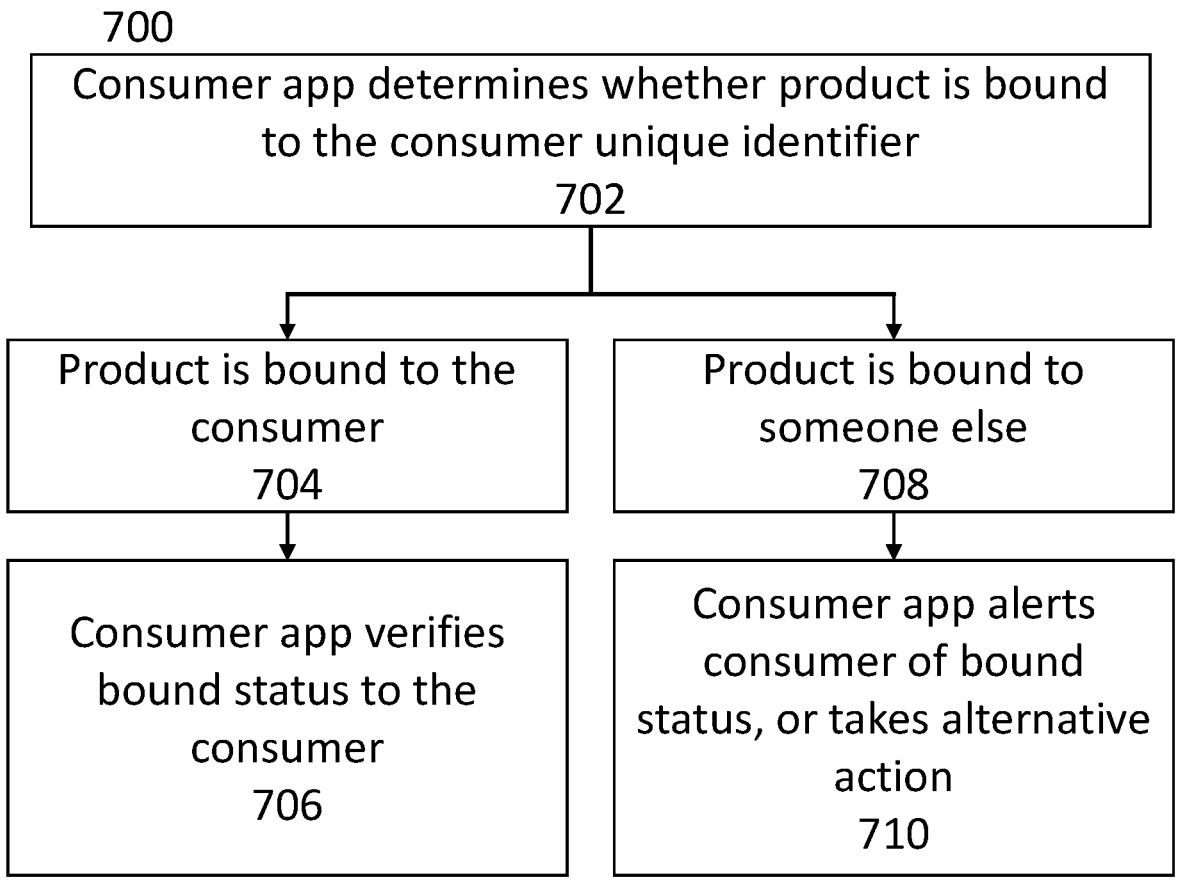
FIG. 10 shows an exemplary embodiment of further steps of a consumer verification process.

In the event that the product is currently bound to some party or to some set of identifying information, as provided in FIG. 10, a scanning device may determine this in a further verification process 700. According to an exemplary embodiment, upon determining that the product is bound to some party, a consumer app may, in a first step 702, determine whether the product is bound to a unique identifier of the consumer, or whether it is bound instead to some other party. If the product is bound to the consumer 704 and the unique identifier of the consumer matches the unique identifier with which the product is associated, the consumer app may then verify the bound status to the consumer 706.

It may then be possible for a game application or another virtual community application to enable access to one or more items or other content within the game or virtual community based, for example, on receipt of a verification record that the product has been bound to a unique identifier of a particular consumer. For example, according to an exemplary embodiment, a user may provide a unique identifier that they are associated with in a verification system to the virtual community, which may then retrieve one or more records of apparel or other articles that are associated with the user in the verification system, for example by searching a database based on the unique identifier. A server operating the virtual community may then receive records of one or more products that have been purchased by the consumer and bound to the consumer that are also represented in the virtual community and may enable access to those products within the virtual community; alternatively or additionally, the server operating the virtual community may receive records of one or more products that have been purchased by the consumer and bound to the consumer that provide some other bonus within the virtual community, and enable this other bonus. (For example, in an exemplary embodiment, a player may receive in-game currency or experience points for purchasing a certain product and binding it to their unique identifier.)

In the event that the product is bound to someone other than the consumer 708, it may be contemplated for the consumer app to alert the consumer that the product is already bound to someone else 710, which may require some other form of intervention on the part of the consumer to resolve. For example, this may provide the user with an interface option to provide a report of the already-bound product to a retailer or to some other party, such as the manufacturer, or may automatically provide this report if desired. As one alternative, for example, it may be contemplated to automatically send a report to a retailer only when a GPS of the system detects that the user is in the retailer's store at the time that the scan was made (in order to allow them to better resolve the error or respond to an insider attempt to steal the item), or alternatively it may be contemplated to automatically forward a report to a manufacturer under the same circumstances (based on the proposition that the retainer may be selling counterfeit goods). Other variations on this may be contemplated as well. As another alternative, it may be contemplated to automatically send a report of the time and location of the scanning, or of any other applicable information, to the consumer to whom the product has been bound; this may, for example, remind the consumer to unbind the product from their own unique identifier, or may allow the consumer to better trace stolen goods if they did not voluntarily part with the item.

Figure 11:
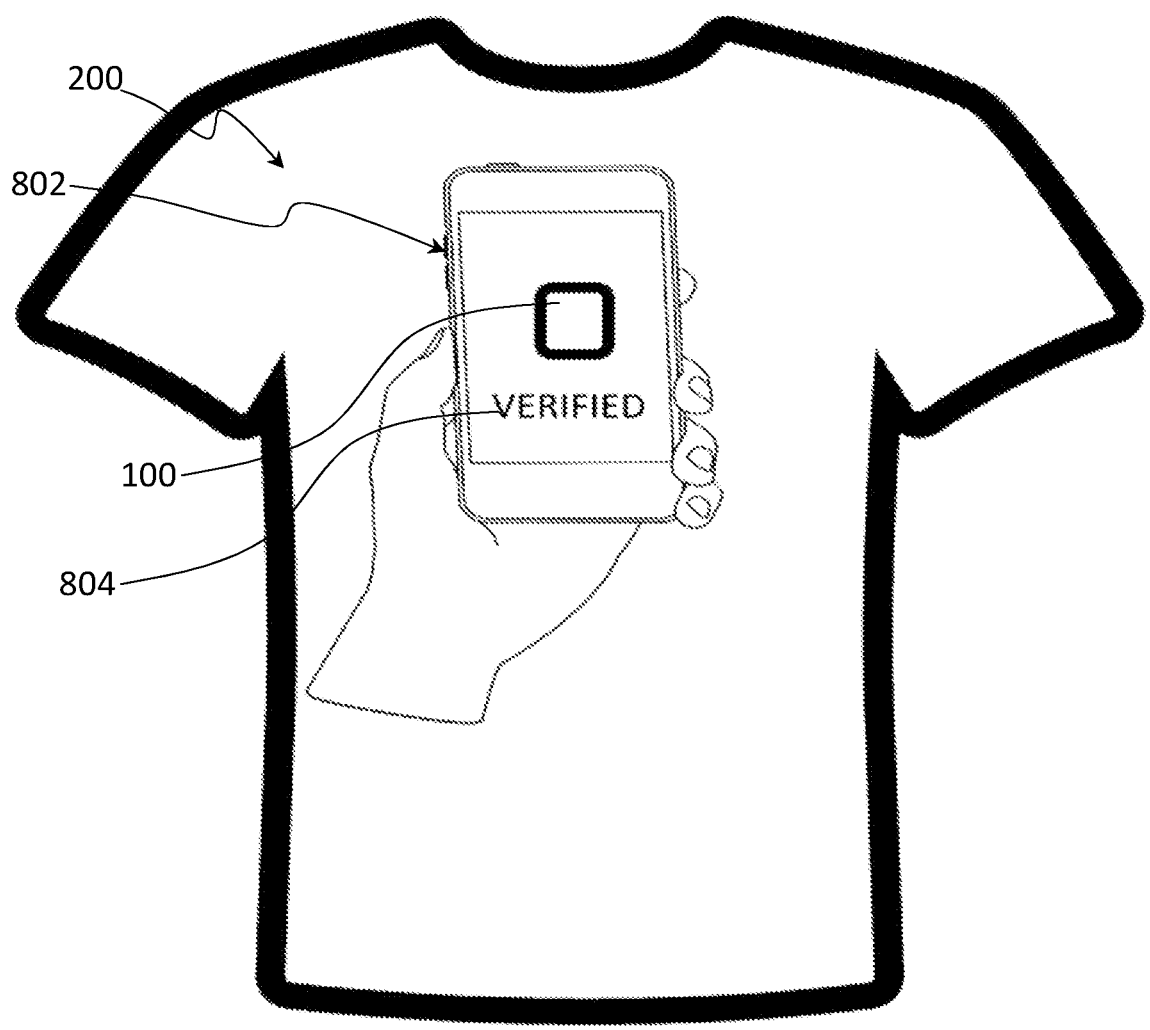
FIG. 11 shows an exemplary embodiment of a scanning process.

Turning now to FIG. 11, a visualization of a scanning process may be provided. A product, such as a garment 200, may be provided with a smart device, which in this case may be a decorative pin 100 applied to the front of the garment 200, but may also, in other exemplary embodiments, be or include a scannable component 102 provided elsewhere within the garment 200 or other product. A user may scan the smart device with a scanner application on a mobile device 802 or with some other scanner, for example by placing their mobile device within range to communicate with an NFC tag embedded within the decorative pin 100, and may operate the scanner application, which may read the information embedded in the scannable component 102 and take some further action such as communicating with an online service. For example, in an exemplary embodiment where the act of scanning is used to verify that the scanning and scanned players have met up in the real world for the purposes of achieving some action within the virtual community, the scanner application may, based on reading a decorative pin 100 associated with the virtual community, cause the action to be executed within the virtual community. In another exemplary embodiment where the smart device is instead a product tag applied to a particular product, then the scanner application may be used in order to perform a consumer verification process such as consumer verification process 500. When an action is taken by the scanner application, such as when the scanner application has sent a verify request to an online service and received a verification response from the online status, the scanner application may provide feedback 804 to the user in some form, such as by indicating that a scan has been completed or that the product has been verified.

Figure 12:
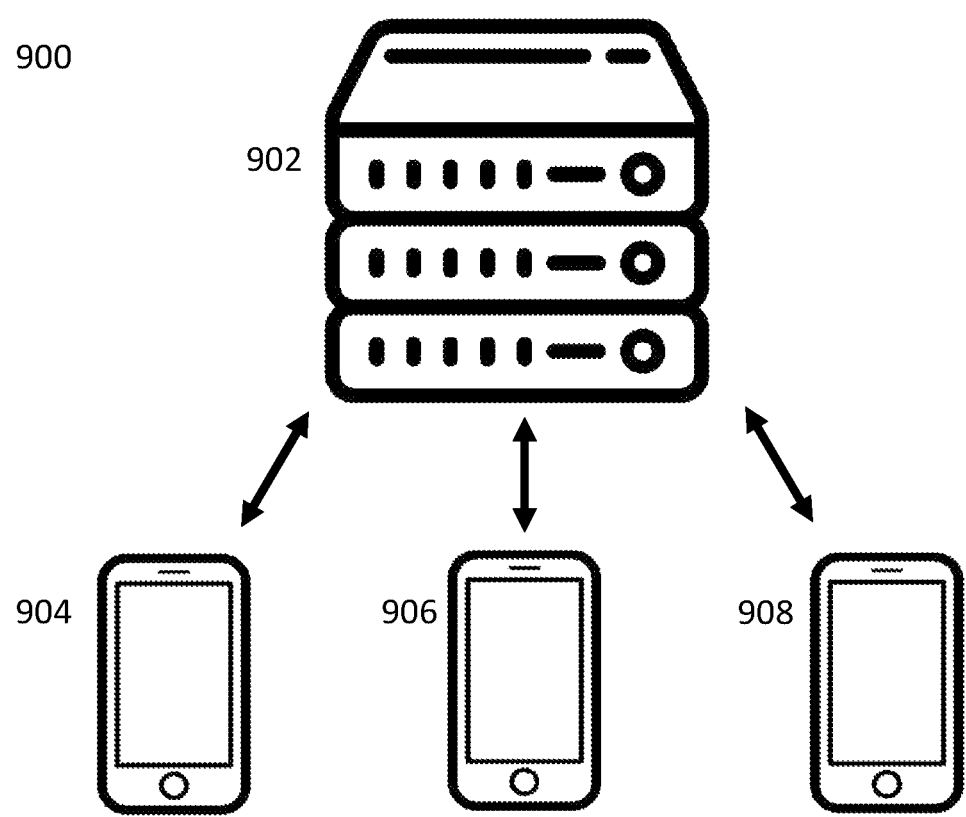
FIG. 12 shows an exemplary embodiment of an authenticity verification system.

Turning finally to FIG. 12, an exemplary embodiment of an authenticity verification system 900 may be provided. It may be contemplated for the authenticity verification system 900 to include an online service 902, which may be one or more verification servers associated with a registration database and configured to communicate via the Internet. It may further be contemplated for the authenticity verification system 900 to include a plurality of scanner devices, such as mobile devices configured to run a product registration application, a product verification application, and a consumer verification application; a mobile device configured to run a product registration application and configured to provide or facilitate a product registration process 300 may be shown as a first mobile device scanner 904, a mobile device configured to run a product validation application and configured to provide or facilitate a product verification process 400 may be shown as a second mobile device scanner 906, and a mobile device configured to run a consumer verification application and configured to provide or facilitate a consumer verification process 500 may be shown as a third mobile device scanner 908. Other configurations of such a system may of course be contemplated; for example, as noted, it may be contemplated to have one or more of the scanners be implemented on a device other than a mobile device, such as a fixed scanner on an assembly line of a manufacturer and so forth.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for identifying and authenticating a physical article to a virtual environment, comprising:
    at least one physical tag having a scannable component, the scannable component comprising an antenna communicatively coupled to a non-volatile memory and configured to transmit data stored on the non-volatile memory from the antenna upon scanning of the antenna and energization of the antenna, said data comprising at least a registration data record; and
    a mobile device configured to interface with the scannable component, comprising a mobile device antenna configured to energize the antenna, the mobile device further comprising a game program configured to provide a game and associated with a game user account;
    wherein the scannable component is associated with a second game user account;
    wherein the mobile device is configured to perform steps of:
    receiving, on the mobile device, an instruction to perform an authenticity verification of the scannable component;
    determining that the mobile device is within range of the scannable component, energizing the scannable component, and retrieving information from the scannable component, said information comprising identification information for a user uniquely associated with the scannable component;

based on the identification information, communicating with a server configured to retain an authenticity validation data record associated with the scannable component generated based on and subsequently to the registration data record, and retrieving, from the server, a verification response based on the authenticity validation data record associated with the scannable component and further comprising binding data;

based on the identification information, activating a feature within the game, wherein activating the feature within the game comprises an interaction with game information of the user uniquely associated with the scannable component;

wherein activating the feature within the game comprises, after determining that the mobile device associated with the game user account is within range of the scannable component associated with the second game user account, initiating an interaction between the game user account and the second game user account within a game world having a game environment in which the game user account and the second game user account are defined, said interaction comprising changing a location of the game user account within the game environment based on information associated with the second game user account; and updating stored game data of the game based on the activation of the feature.

2. The system of claim 1, wherein the physical tag is a badge having the scannable component embedded therein, having a flat front side and having a rear side comprising a coupling configured to attach to clothing of a wearer, the scannable component comprising a near-field communication (NFC) component.

3. The system of claim 1, wherein the interaction comprises moving a first character associated with the game user account to a position of a second character associated with the second game user account within the game environment.

4. The system of claim 1, wherein the interaction comprises a power increase for an action provided by a first character associated with the game user account.

5. The system of claim 1, wherein the interaction comprises summoning a non-player creature within a game environment.

6. The system of claim 1, wherein the physical tag is provided in a product associated with an in-game representation, wherein the user uniquely associated with the scannable component is associated with the game user account, and wherein activating the feature within the game comprises providing, to the user, in the game, the in-game representation.

7. The system of claim 6, wherein the physical tag is provided in an article of apparel, and wherein the in-game representation comprises a virtual article of apparel provided within the game.

8. The system of claim 1, wherein receiving, on the mobile device, the instruction to perform the authenticity verification of the scannable component, and retrieving information from the scannable component, further comprise:

providing, with the mobile device, to an online service comprising a server, identity authentication information;

sending, with the mobile device, a verification request to the online service; and receiving, on the mobile device, a verification response from the online service.

9. The system of claim 8, wherein the verification response comprises a binding status associated with the physical tag.

10. The system of claim 9, wherein the mobile device is further configured to perform steps of:

determining that the physical tag is bound to a party other than the user, said party associated with the second game user account; and providing, on the mobile device, a prompt for user intervention prior to activating the feature within the game.

11. The system of claim 1, wherein the physical tag is provided in a smart device having at least one signal output provided on the smart device; and wherein determining that the mobile device is within range of the scannable component further comprises energizing the at least one signal output.

12. A method for identifying and authenticating a physical article to a virtual environment, comprising:

identifying, on the physical article, at least one physical tag having a scannable component, the scannable component comprising an antenna communicatively coupled to a non-volatile memory and configured to transmit data stored on the non-volatile memory from the antenna upon scanning of the antenna and energization of the antenna, said data comprising at least a registration data record;

receiving, on a mobile device configured to interface with the scannable component, an instruction to perform an authenticity verification of the scannable component; wherein said mobile device comprises a mobile device antenna configured to energize the antenna and further comprises a game program configured to provide a game and associated with a game user account, wherein the scannable component is associated with a second game user account;

determining that the mobile device is within range of the scannable component, energizing the scannable component, and retrieving information from the scannable component, said information comprising identification information for a user uniquely associated with the scannable component;

based on the identification information, communicating with a server configured to retain an authenticity validation data record associated with the scannable component generated based on and subsequently to the registration data record, and retrieving, from the server, a verification response based on the authenticity validation data record associated with the scannable component and further comprising binding data;

based on the identification information, activating a feature within the game, wherein activating the feature within the game comprises an interaction with game information of the user uniquely associated with the scannable component;

wherein activating the feature within the game comprises, after determining that the mobile device associated with the game user account is within range of the scannable component associated with the second game user account, initiating an interaction between the game user account and the second game user account within a game world having a game environment in which the game user account and the second game user account are defined, said interaction comprising changing a location of the game user account within the game environment based on information associated with the second game user account; and updating stored game data of the game based on the activation of the feature.

13. The method of claim 12, wherein receiving, on the mobile device, the instruction to perform the authenticity verification of the scannable component, and retrieving information from the scannable component, further comprise:

providing, with the mobile device, to an online service comprising a server, identity authentication information;

sending, with the mobile device, a verification request to the online service; and receiving, on the mobile device, a verification response from the online service comprising a binding status of the physical tag.

14. The method of claim 13, further comprising steps of:

determining that the physical tag is bound to a party other than the user, said party associated with the second game user account; and providing, on the mobile device, a prompt for user intervention prior to activating the feature within the game.

15. A non-transitory computer-readable medium comprising program code that, when executed, causes a processor of a mobile device to execute steps of:

identifying, on a physical article, at least one physical tag having a scannable component, the scannable component comprising an antenna communicatively coupled to a non-volatile memory and configured to transmit data stored on the non-volatile memory from the antenna upon scanning of the antenna and energization of the antenna, said data comprising at least a registration data record;

receiving, on the mobile device, said mobile device configured to interface with the scannable component, an instruction to perform an authenticity verification of the scannable component; wherein said mobile device comprises a mobile device antenna configured to energize the antenna and further comprises a game program configured to provide a game and associated with a game user account, wherein the scannable component is associated with a second game user account;

determining that the mobile device is within range of the scannable component, energizing the scannable component, and retrieving information from the scannable component, said information comprising identification information for a user uniquely associated with the scannable component;

based on the identification information, communicating with a server configured to retain an authenticity validation data record associated with the scannable component generated based on and subsequently to the registration data record, and retrieving, from the server, a verification response based on the authenticity validation data record associated with the scannable component and further comprising binding data;

based on the identification information, activating a feature within the game, wherein activating the feature within the game comprises an interaction with game information of the user uniquely associated with the scannable component;

wherein activating the feature within the game comprises, after determining that the mobile device associated with the game user account is within range of the scannable component associated with the second game user account, initiating an interaction between the game user account and the second game user account within a game world having a game environment in which the game user account and the second game user account are defined, said interaction comprising changing a location of the game user account within the game environment based on information associated with the second game user account; and updating stored game data of the game based on the activation of the feature.

\* \* \* \* \*